United States Patent [19]

French et al.

[11] 4,314,298
[45] Feb. 2, 1982

[54] MULTITRACK MAGNETIC HEAD EMPLOYING DOUBLE HELIX STRUCTURE

[75] Inventors: William W. French, Cardiff-by-the Sea; James U. Lemke, Del Mar; Richard J. McClure, San Diego, all of Calif.

[73] Assignee: Eastman Technology, Inc., Rochester, N.Y.

[21] Appl. No.: 82,847

[22] Filed: Oct. 9, 1979

[51] Int. Cl.³ .......................... G11B 5/27; G11B 5/20; G11B 5/12
[52] U.S. Cl. .................................... 360/121; 29/603; 360/122; 360/123; 360/125
[58] Field of Search ............ 360/121, 122, 123, 125, 360/126–127, 119, 110; 336/178, 184; 29/603

[56] References Cited

U.S. PATENT DOCUMENTS

| | | | |
|---|---|---|---|
| 2,754,569 | 7/1956 | Kornei | 360/120 |
| 3,521,295 | 4/1967 | Poole et al. | 360/123 |
| 3,535,466 | 10/1970 | Foster | 360/120 |
| 3,550,150 | 12/1970 | Gardner et al. | 360/123 |
| 4,001,841 | 1/1977 | Berkowitz | 360/121 |
| 4,084,199 | 4/1978 | Dorreboom | 360/121 |

OTHER PUBLICATIONS

IBM Tech. Disc. Bull., A. C. Thorpe et al., Multi--Channel Magnetic Recording Head, vol. 3, No. 10, Mar. 1961, p. 32.
IBM Tech. Disc. Bull., L. J. Poch et al., Magnetic Head, vol. 2, No. 1, Jun. 1959, p. 42.

*Primary Examiner*—Alfred H. Eddleman
*Attorney, Agent, or Firm*—Robert F. Cody

[57] ABSTRACT

A multitrack magnetic head is made from an electrically conductive first helix formed on an iron wire that is, in turn, wound to form a second helix. By longitudinally cutting along one side of the second helix, the first helix is severed into respective coils on discrete gapped cores.

6 Claims, 24 Drawing Figures

MULTITRACK MAGNETIC HEAD EMPLOYING DOUBLE HELIX STRUCTURE

BACKGROUND OF THE INVENTION

1. Field of the Invention

This invention relates in general to multitrack magnetic heads and to methods and parts for forming such heads.

2. Description Relative to the Prior Art

In the art of magnetic recording, there is a trend toward the use of multitrack magnetic heads having large numbers of cores per unit width across the head surface that interacts with the recording medium. One explanation for this trend may be found in the fact that a plurality of head cores can record a specific amount of data at an information writing speed which is only about 1/(number of active cores) of the information writing speed which would be required when writing with only one core. For example, for a playback gap length of, say, $100\mu''$ ($\mu''$ = microinch), a bandwidth of 2 mHz would necessitate a single core writing speed of 200 inches per second (ips) if use of the recording medium is to be optimized. By contrast (still using playback gap lengths of ($100\mu''$), that same bandwidth of 2 mHz can be written by a 500-track record head at a relative head-to-medium speed of only 0.4 ips (i.e., $(2\times10^6)/500\times100\times10^{-6}=0.4$ ips). Such recording of a large bandwidth in a large number of tracks at low writing speed suggests, among other things, the linear tape recording of video information. Linear tape recording of video information, as opposed to the recording techniques employed in helical scan and quadruplex video recorders, implies a simplification of hardware: not only does a lessened information writing speed relax the mechanical demands of the recording operation, but head switching, rotary head drums and various electronics are obviated, as well.

Perhaps the most common technique for forming a multitrack magnetic head is that which is shown generally in U.S. Pat. No. 4,084,199. Such a technique is characterized by the respective winding of coils on discrete cores, and the positioning of the coil-supporting cores in thin slots in a head block. Because of the tedium inherent in the winding of coils on tiny cores, and because of the brittleness associated with the slotting of the head block, a head made according to the teaching of U.S. Pat. No. 4,084,199 is generally limited to about 30 tracks per widthwise inch of the recording medium. In an attempt to increase the number and density of discrete cores in a multitrack magnetic head, various head manufacturing techniques employing photolithography have been suggested, thereby to avoid the need for discrete coil winding and to avoid the requirement for sawing thin slots in a head block. U.S. Pat. Nos. 3,893,189 and 3,983,622 are representative of such techniques.

While photolithography and similar techniques hold promise for future developments in the art of multitrack magnetic heads, it must, however, be realized that such techniques have limited versatility when it comes to providing multitrack magnetic heads of varying design. It would, for example, be desirable to have a multitrack magnetic head which is such that, when made from a basic core material, variations in the resultant head design can be provided relatively easily, and without ado. In other words, were it desired, for example, to provide a multitrack magnetic head of N cores with M turns per core, or a multitrack magnetic head of X cores with Y turns per core, such could be provided handily from the same basic core material.

SUMMARY OF THE INVENTION

In accordance with the present invention, a double helix core-and-coil structure is provided, the preselectable length of such double helix core-and-coil structure determining the number of cores which are to be employed in a head constructed from such core-and-coil structure. One helix of the double helix core-and-coil structure constitutes an electrically conductive coil wrapped on a length of magnetic wire; and which magnetic wire is, itself, helically wound to form the second helix of the double helix core-and-coil structure. By longitudinally cutting through one side of the double helix core-and-coil structure, a succession of gapped cores is provided; and by judiciously contacting the electrically conductive helix, supported by the magnetic helix, at a predetermined arc of the magnetic helix, the number of turns of the coils in question may be selected. (The term "gap", as used herein, does not necessarily mean "transducer gap". Rather, "gap" shall be interpreted to mean any break in an otherwise continuous form, and which break may or may not constitute a "transducer gap".)

It will be appreciated that a magnetic head made by the technique disclosed herein will comprise coils which extend virtually the full extent of their supporting cores, despite the fact that (perhaps) only a preselected number of turns of such coils are electrically active.

The invention will be described with reference to the figures, wherein:

FIGS. 13 through 16 are illustrations which respectively correspond to the illustrations of FIGS. 7 through 10.

Figure 1:
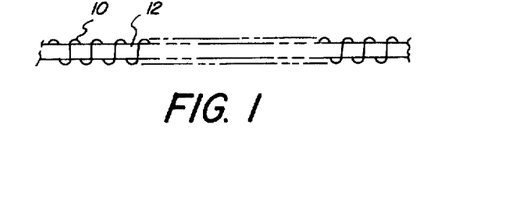
FIG. 1 is a side view showing one helix of the double helix core-and-coil structure.
Figure 2:
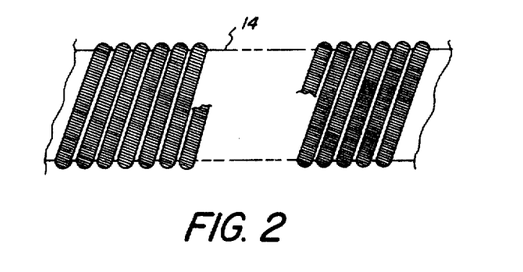
FIG. 2 is a side view showing the double helix core-and-coil structure.
Figure 3A:
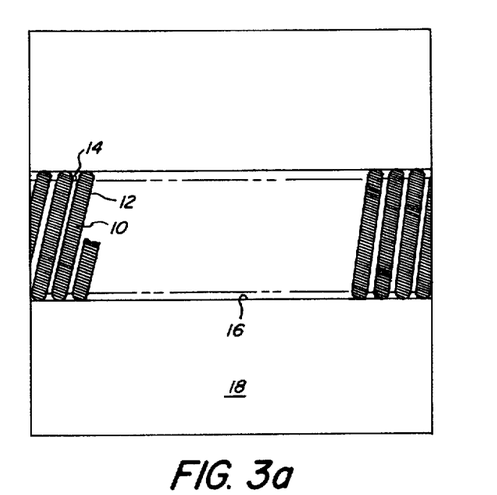
FIGS. 3a, 3b and 3c are respectively plan, edge and side views of apparatus employed in the practice of the invention.
Figure 3B:
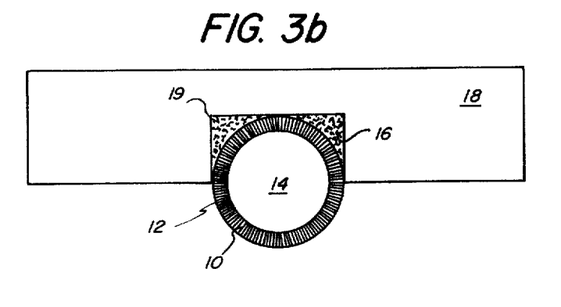
Figure 3C:
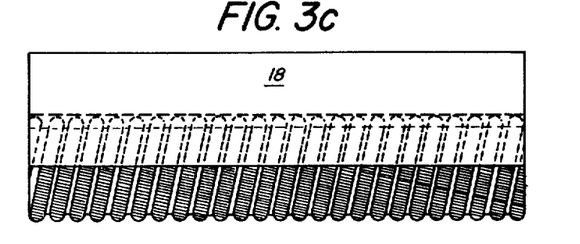
Figure 4:
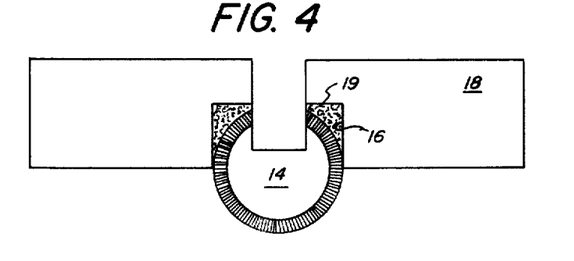
FIG. 4 is an edge view, like that of FIG. 3b, but showing a gap-forming cut in the double helix core-and-coil structure.
Figure 5A:
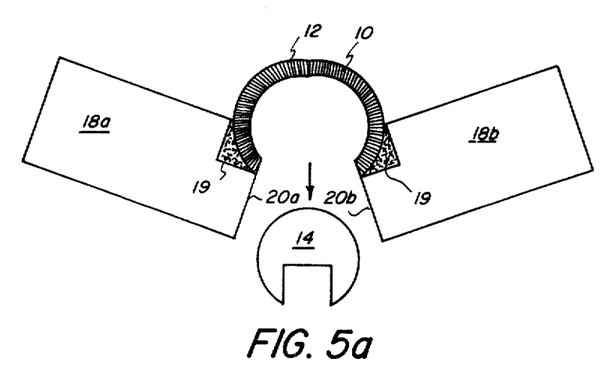
FIGS. 5a and 5b are edge views like that of FIG. 3 b, but showing, respectively, the removal of a mandrel employed as part of the head and gap-forming processes.

A multitrack magnetic head having 252 coil-wound cores per widthwise inch of the head, and which head embodies the invention, will now be described in terms of its method of manufacture:

Referring to FIG. 1, a very fine insulation-covered copper wire 10 (0.0009 inch in diameter) is helically wound into a coil along and about the length of an iron wire 12 (0.002 inch in diameter). Then, as depicted in FIG. 2, the coil-supporting iron wire 12 is, itself, helically wound on a mandrel 14, thereby forming the basic double helix core-and-coil structure. (It will be appreciated that the double helix core-and-coil structure may be provided, and stocked, in large spools and/or skeins thereof, whereby multitrack heads of various numbers of cores may be provided, depending upon the length of the double helix core-and-coil structure which is employed.) The mandrel 14, which in this case has a circular cross-section of 0.022 inch in diameter, and is coated with a mold release material, is then laid along the length of a groove 16 in a non-magnetic jig 18. See FIGS. 3a, 3b and 3c. After the double helix core-and-coil structure is bonded in place in the groove 16 by epoxy 19, a longitudinal cut 20 (see FIG. 4) is made into the double helix core-and-coil structure, thereby cutting the jig in half and permitting it to be folded (at least partially), as in FIG. 5a; this causes the mandrel to "mold-release" and to pop free of the double helix core-and-coil structure.

Figure 5B:
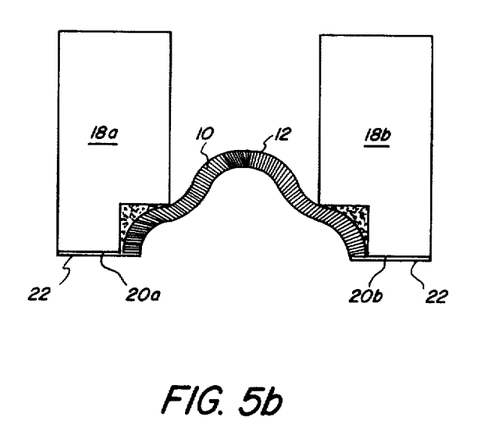

Using the double helix core-and-coil structure (10, 12) as a hinge, the two pieces 18a and 18 b of the jig are positioned (see FIG. 5b) so as to place the cut edges 20a, b in a common plane. The edges 20a, b are then lapped flat and thereafter coated with an extremely thin coat (about 1 micron in thickness) of aluminum oxide 22 (or the like), the aluminum oxide serving as a gap spacer for the head under construction.

Figure 6A:
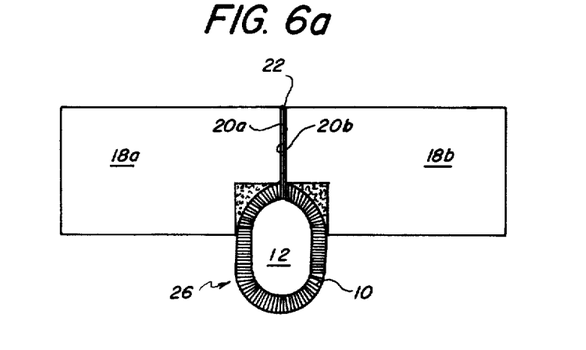
FIGS. 6a and 6b are, respectively, edge and under views illustrating additional procedures for forming a gap line in a multitrack magnetic head embodying the invention.
Figure 6B:
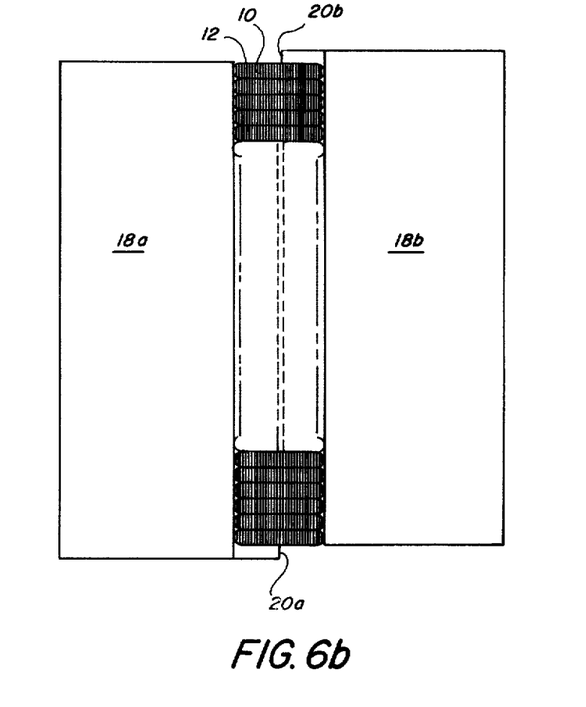

Now, as depicted in FIG. 6a, the jig parts 18a, b are swung back and positioned so that the edges 20a, b face each other with the gap spacer aluminum oxide therebetween, such positioning causing the cross-section of the double helix core-and-coil structure (10, 12) to collapse into a generally elliptical form. As best illustrated in FIG. 6b, the jig parts 18a, b (before, after or during the time they are swung back into position) are relatively shifted longitudinally of the double helix core-and-coil structure by an amount related to the pitch of the iron wire helix, whereby the cut helical iron wire (12) gets converted into a succession of substantially planar, untwisted, cores having respective gaps (i.e., high reluctance discontinuities) therein. With the jig parts so positioned, a non-magnetic block 23 (see FIG. 7) having a groove 24 is so bonded to the structure of FIGS. 6a and 6b that the unsupported part 26 of the double helix core-and-coil structure (10, 12) resides in and along the length of the groove 24. After an insulation-covered copper wire 28 is threaded through the center of the double helix core-and-coil structure, thereby to serve as a common bias lead for the cores of the head under construction, epoxy is employed to hold the wire 28 in place and to fill the voids of the groove 24 and of the double helix core-and-coil structure.

Figure 7:
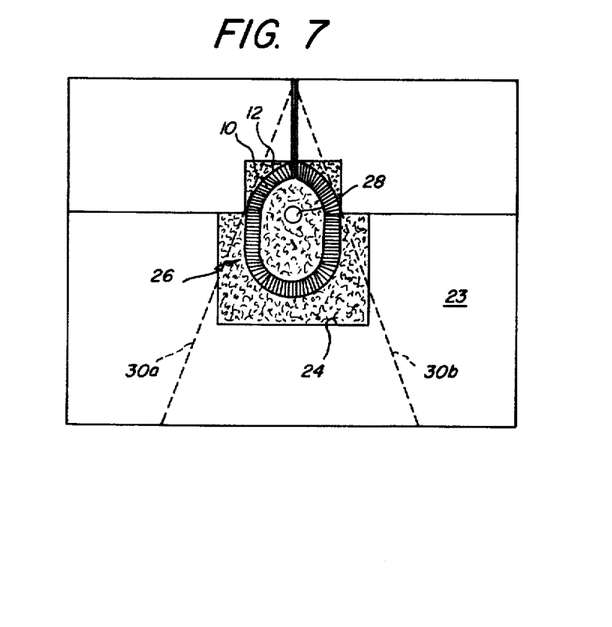
FIGS. 7 and 8a and 8b are views useful in describing the manner in which electrical contact is made to the electrically conductive helix of the double helix core-and-coil structure.

Because of the very nature of the double helix core-and-coil structure, electrical contact to the coils formed from the helically wound electrically conductive wire 10 may be made, simply, by lapping the structure of FIG. 7 to the lap lines 30a, b. While such lapping triangulates (FIG. 8a) the cross-section of the head under construction, it conveniently forms aligned apertures through which rows of copper contact points 32 are exposed on each of two opposing sides of the head; and which contact points comprise respective parts of the double helix core-and-coil strucuture (10, 12). See FIG. 8b. Leads from ribbon cables are then soldered respectively to the rows of copper contact points. (It will be appreciated that, although it will be usual to bring leads to all of the copper points 32, it will be possible to vary the number and density of the active cores of the head by selectively bonding leads to different ones of the contact points 32. For example, if it is desired to provide a 126-track head, instead of a 252-track head, every other lead of the ribbon cables is simply left opened).

Figure 8A:
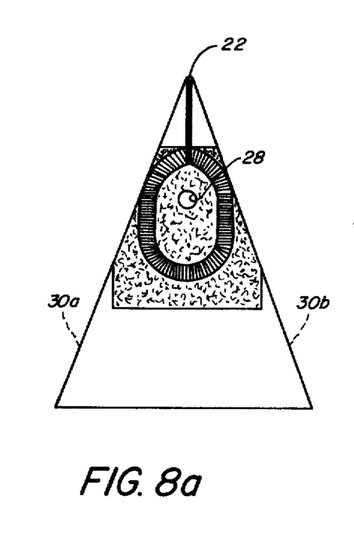
Figure 8B:
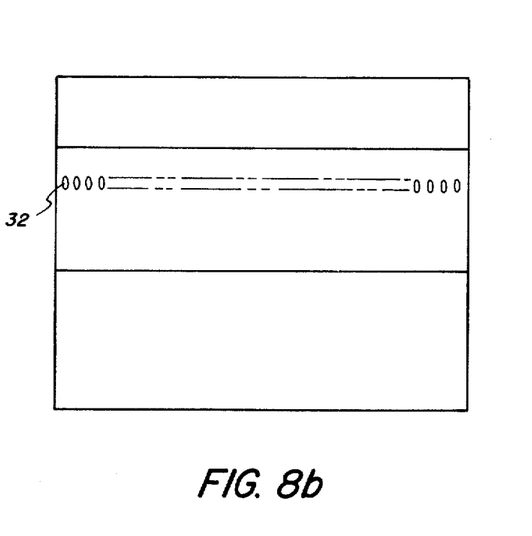
Figure 9:
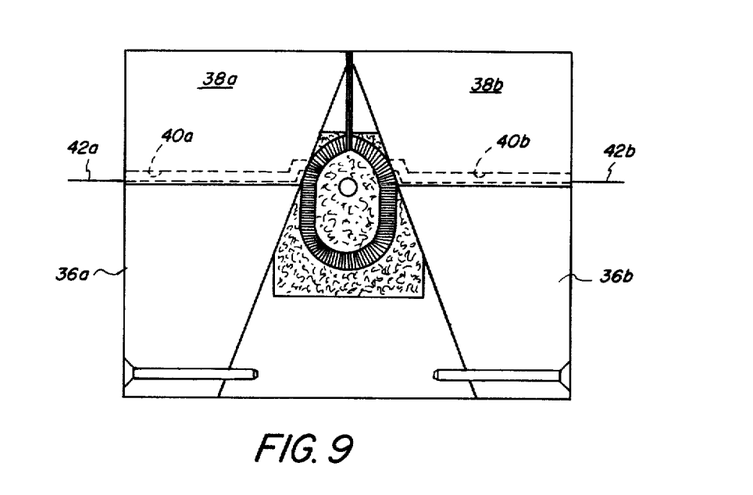
FIGS. 9 and 10 are side elevational views showing how a multitrack magnetic head embodying the invention may be finished.
Figure 10:
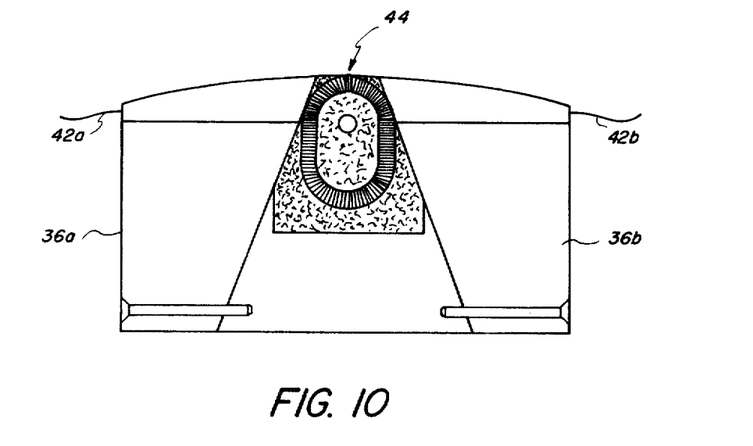

In finishing off the head, block pieces 36a, b and 38a, b are secured (FIG. 9) to the triangular block of FIG. 8a, the block pieces 38a, b being provided with channels 40a, b through which the leads (42a, b) may pass. Then, finally, the head is contoured as in FIG. 10 to place the gap line 44 at the head surface which is disposed to contact the recording medium.

Whereas the number of discrete cores in a head made as described above depends upon the length of the double helix core-and-coil structure which is employed, the number of turns on each of the cores depends on the lap angle employed to expose the copper contact points 32, as indicated in connection with FIG. 7.

Figure 11:
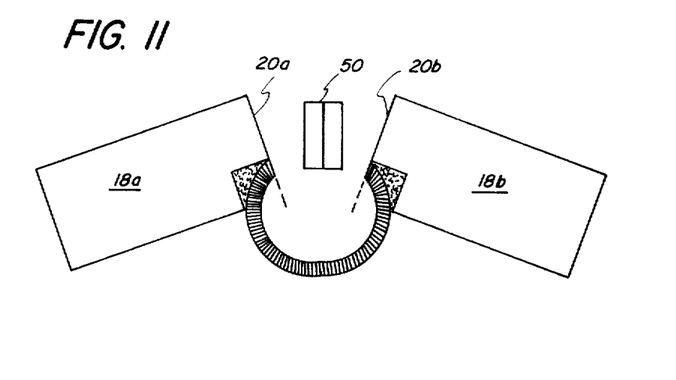
FIG. 11 is an edge view useful in describing a presently preferred technique for forming a gap in a multitrack magnetic head according to the invention.
Figure 12A:
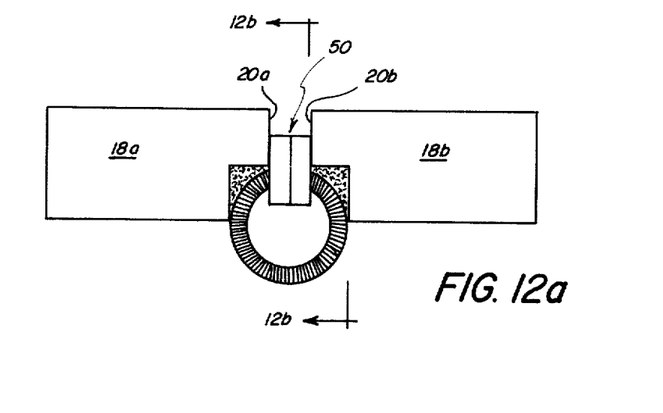
FIGS. 12a, 12b and 12c are, respectively, edge, side elevational and schematic perspective views which relate to the showing of FIG. 11 and which are useful in describing the invention.
Figure 12B:
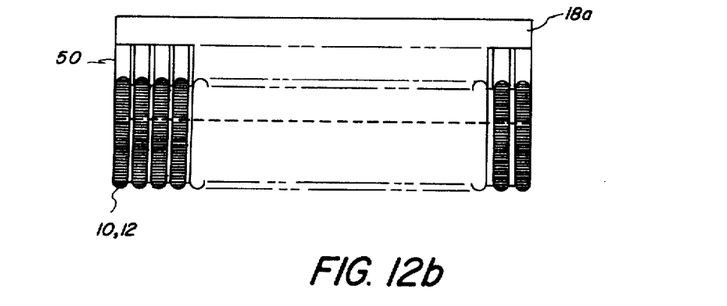
Figure 12C:
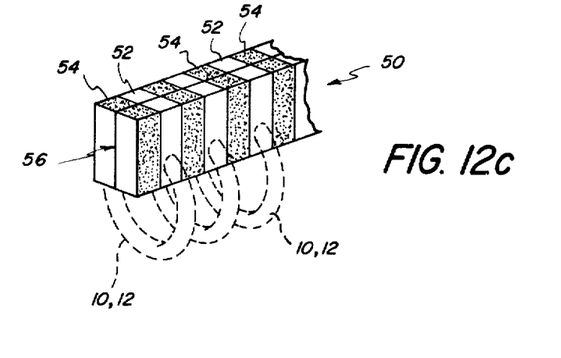
Figure 13:
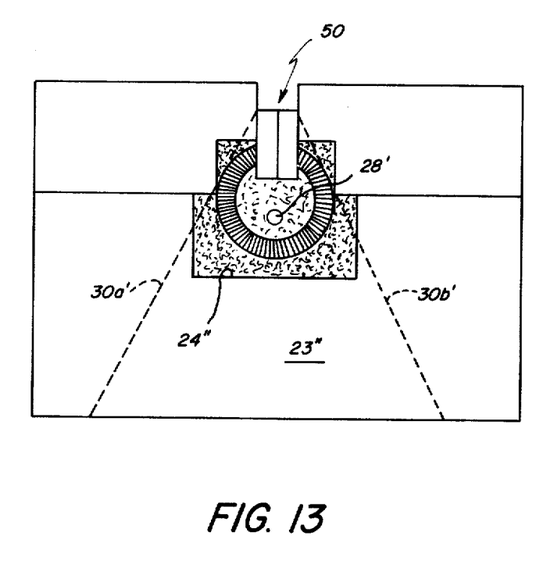
Figure 14A:
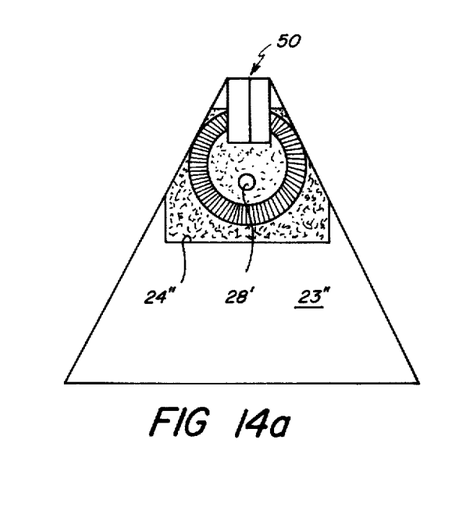
Figure 14B:
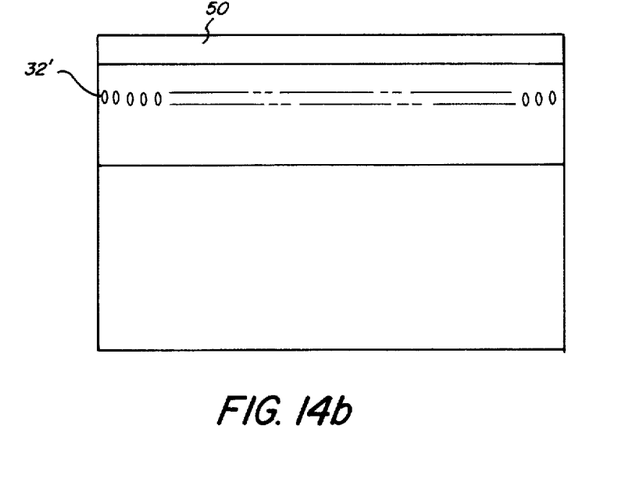
Figure 15:
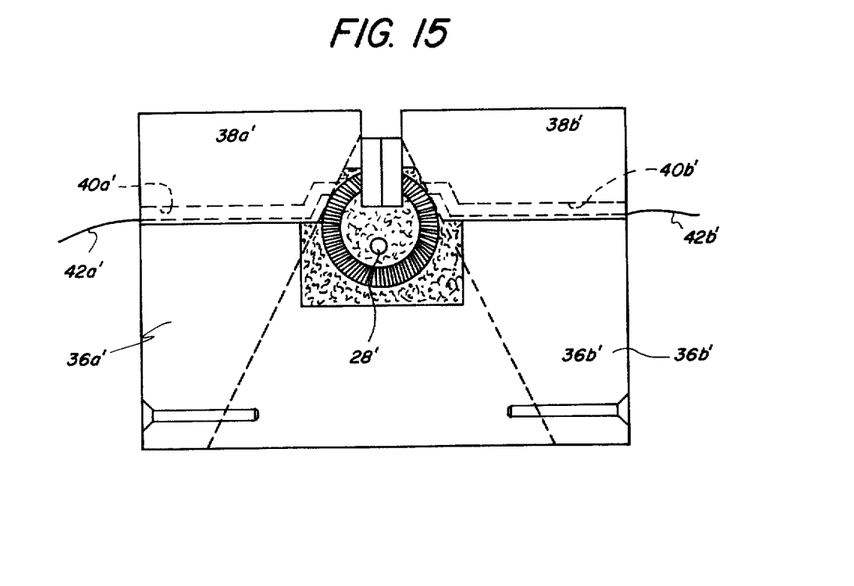
Figure 16:
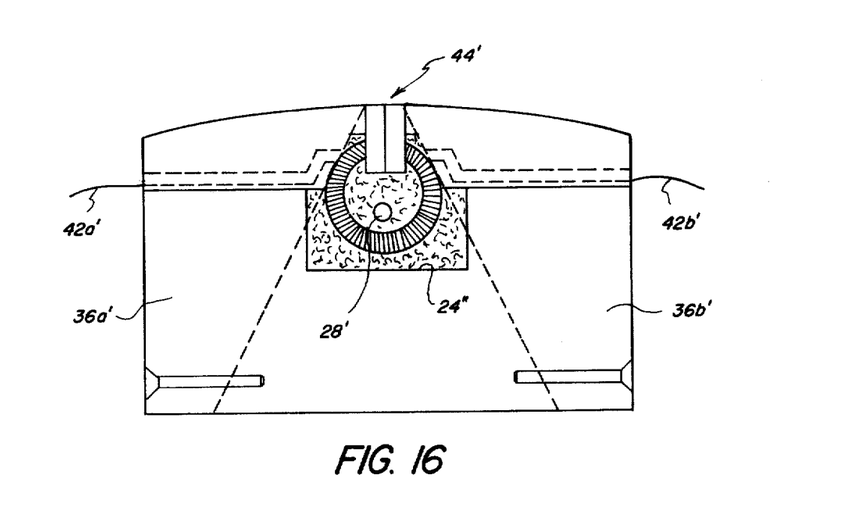

Although a transducer gap(s) formed by the head manufacturing technique described above is useful for many purposes, the provision of a high precision gap to optical tolerances is dependent on the ability of the iron wire 12 to sustain and withstand precision lapping. And, it will be appreciated, the life of such a gap is directly related to and dependent upon the (small) diameter of the iron wire 12 which is used. To improve on the quality and life of a head gap embodied in a multitrack magnetic head according to the invention, the teaching of FIGS. 1 through 10 above may be modified slightly as illustrated in connection with FIGS. 11 through 16: After the double helix core-and-coil structure has been longitudinally cut, as was taught in connection with FIG. 4, and the mandrel 14 popped free as in FIG. 5a, a pre-formed pole tip piece 50 (FIG. 11) approximating the dimensions of the cut 20 is placed in pressing relation between the core edges 20a, b. The pole tip piece 50, which is best depicted in the perspective showing of FIG. 12c, is preferably formed from a stack of ferrite pieces 52 interspersed with and bonded to ceramic pieces 54, the stack being longitudinally halved, lapped and reformed with a high reluctance gap spacer 56 between the halves. After placing the pole tip piece 50 between the core edges 20a, b (still referring to FIG. 11), the jig pieces 18a, b are swung back (FIG. 12a) while (or before, or after) longitudinally shifting the jig pieces 18a, b (see FIG. 12b) by an amount substantially equal to the pitch of the iron wire helix, as was done above regarding FIG. 6b. Thereafter, as depicted in connection with FIGS. 13 through 16, the multitrack head under construction is provided with coil and bias leads; and is contoured, essentially as was described above in connection with FIGS. 7 through 10. (The parts of FIGS. 13 through 16 having corresponding parts in FIGS. 7 through 10 are identified with the same, but primed or double-primed, character notations.)

The invention has been described in detail with particular reference to certain preferred embodiments thereof, but it will be understood that variations and modifications can be effected within the spirit and scope of the invention.

What is claimed is:

1. A multitrack magnetic head comprising:
   (a) a plurality of magnetic cores having respective gaps therein,
   (b) respective discrete coils on said cores, each of said coils being substantially helically wound on its corresponding core and extending from a point at one side of the gap thereof to a point at the other side of said gap without bridging said gap, and
   (c) means for supporting said cores so that the gaps thereof are laterally spaced apart from each other, and in alignment, said means for supporting said cores being provided with first and second pluralities of aligned apertures which spatially coincide with respective parts of said coils, and through which apertures electrical contact may be made to said coils,
   said means for supporting said cores being such that the first and second pluralities of aligned apertures of said supporting means spatially coincide with respective aligned coil parts, at least some of which are within the extreme ends of said coils and away from the gaps of their respective cores, the number of electrically active turns of said coils being dependent upon the relative proximity of said first and second pluralities of aligned apertures.

2. The magnetic head of claim 1, including a pole tip piece bridging said aligned gaps, said pole tip piece being comprised of first and second magnetic parts with a high reluctance gap spacer therebetween.

3. A multitrack magnetic head comprising:
   (a) first and second magnetic cores having respective gaps therein,
   (b) means for supporting said cores in spaced-apart relationship so that the gaps of said cores are aligned along a gap line,
   (c) a first coil substantially helically wound on said first core and extending from proximate one end of the first core gap to proximate the other end of that gap without extending across the first core gap,
   (d) a second coil substantially helically wound on said second core and extending from proximate one end of the second core gap to proximate the other end of the second core gap without extending across the second core gap, said means for supporting said cores having first, second, third and fourth apertures therein, said first and second apertures respectively exposing first parts of said first and second coils and said third and fourth apertures exposing respective second parts of said first and second coils, said first and third apertures cooperating with said first coil and said second and fourth apertures cooperating with said second coil, whereby electrical leads may be connected to said coils via said apertures so that said magnetic head may be adapted to record or reproduce signal information.

4. The magnetic head of claim 3 wherein said first, second, third and fourth apertures of said means for supporting said cores are so located with respect to said means that the first and third apertures expose parts of said first coil which are distal with respect to the first core gap, and the second and fourth apertures expose parts of said second coil which are distal with respect to the second core gap.

5. The magnetic head of claim 4 including pole tip means extending across the gaps of said first and second cores, said pole tip means being coupled to said cores and comprised of first and second magnetic means and a thin layer of high reluctance material therebetween.

6. The magnetic head of claim 3 including pole tip means extending across the gaps of said first and second cores, said pole tip means being coupled to said cores and comprised of first and second magnetic means and a thin layer of high reluctance material therebetween.

* * * * *